United States Patent [19]

Hassel et al.

[11] Patent Number: 5,219,216
[45] Date of Patent: Jun. 15, 1993

[54] HANGING DISKETTE STORAGE CABINET

[75] Inventors: H. Charles Hassel, Los Angeles; Gregory DuVall, Santa Monica, both of Calif.

[73] Assignee: MicroComputer Accessories, Inc., Los Angeles, Calif.

[21] Appl. No.: 742,388

[22] Filed: Aug. 8, 1991

[51] Int. Cl.[5] ............................................. A47B 63/00
[52] U.S. Cl. ................................. 312/9.54; 312/183; 312/270.3; 312/351
[58] Field of Search ................ 206/561, 444; 312/184, 312/183, 270.3, 9.54, 351

[56] References Cited

U.S. PATENT DOCUMENTS

| | | | |
|---|---|---|---|
| 253,510 | 2/1882 | Clare | 206/561 X |
| 456,630 | 7/1891 | Morse | 206/561 X |
| 2,522,768 | 9/1950 | Wiepert | 206/561 X |
| 3,273,700 | 9/1966 | Moreau et al. | 206/561 X |
| 3,281,193 | 10/1966 | Murray | 312/184 X |
| 3,365,259 | 1/1968 | Heisman et al. | 312/184 X |
| 4,262,810 | 4/1981 | Ilich | 312/184 X |
| 5,088,801 | 2/1992 | Rorke et al. | 312/184 |

Primary Examiner—Peter R. Brown
Attorney, Agent, or Firm—Price, Gess & Ubell

[57] ABSTRACT

The hanging diskette storage cabinet is a diskette storage box that may be hung between an ordinary pair of hanging rails in a file drawer. By this arrangement, a user may keep diskettes in easy reach and may secure the diskettes by simply locking the file drawer. The diskette box may also include a lid which has an upper recess surface such that, when the diskette storage box is hung in a file drawer, the lid may be open onto and over index tabs carried by files located behind the diskette storage box. In this fashion, the lid may lie flat over the files without damaging the index tabs and allowing the drawer to be closed with the box open. In a second aspect, the hanging diskette storage cabinet is a diskette storage box that may be variably configured. The diskette storage box is preferably dimensioned to accommodate an integral number of diskettes of a first size in one direction and an integral number of diskettes of a second size in the other direction. The diskette box includes false floors and divider vanes allowing the user to customize the box to accommodate diskettes of the first and second size in a multitude of configurations.

19 Claims, 6 Drawing Sheets

HANGING DISKETTE STORAGE CABINET

BACKGROUND OF THE INVENTION

1. Field of the Invention

The present invention relates generally to containers for storing computer diskettes and, more particularly, to a diskette storage cabinet that may be supported between a pair of hanging rails inside of an ordinary file drawer and which may selectably accommodate diskettes of various sizes and in various arrangements.

2. Description of Related Art

Since the advent of the personal computer, every computer user has developed a need for a system of storing computer diskettes. A conventional diskette storage container is simply a box with a lid. Ordinarily, the conventional diskette storage container can only accommodate diskettes of one size and only in a single row in a back-to-back fashion.

Recently, diskettes of various sizes have become common. For example, with many home and office computers, it is now common to use $3\frac{1}{2}''$ diskettes, as well as $5\frac{1}{4}''$ diskettes. One problem with a conventional diskette storage container is that a computer user that works with both $3\frac{1}{2}''$ and $5\frac{1}{4}''$ diskettes must typically have two separate containers. Alternatively, the user may elect to store diskettes of both sizes in the larger storage container intended for the $5\frac{1}{4}''$ diskettes.

Further problems with a conventional diskette storage container are its consumption of valuable desk space and its inability to provide security for stored diskettes. Many conventional diskette storage containers have built-in locks for securing computer diskettes containing valuable or confidential information. However, built-in locks offer little security as it is easy to steal the entire diskette storage container. Because of this weakness, many users choose to manually transport the diskette storage container to and from a nearby location where it may be securely locked away.

SUMMARY OF THE INVENTION

The present invention is directed towards a diskette storage container that resolves the above problems associates with conventional diskette storage containers. In particular, an object of the present invention is to provide a diskette storage container that may reside permanently in a file drawer;

It is a further object of the present invention to provide a diskette storage container that may be supported between an ordinary pair of hanging rails in an ordinary file drawer;

It is a further object of the present invention to provide a diskette storage container that is readily accessible, but may be easily locked up for security purposes;

It is a further object of the present invention to provide a diskette storage container that does not consume valuable desk space.

It is a further object of the present invention to provide a diskette storage container that may be easily reconfigured to accommodate various sized diskettes, as desired.

In accordance with the above objects, the present invention is comprised of a diskette box having an open top and means for hanging the diskette box from hanging rails located on either side of an ordinary file drawer.

In the preferred embodiment, the diskette box is sized to fit between the hanging rails and includes a pair of wings on either side for hanging engagement with the hanging rails.

In a further aspect of the present invention, a diskette storage container is comprised of various components that may be easily configured to accommodate various sized computer diskettes. Such a variable configuration diskette storage container is comprised of means for vertically dividing the diskette box into a plurality of diskette storage areas and means for selectably varying the depth of all or part of the diskette box to a desired depth.

In the preferred embodiment, the diskette storage container is designed to accommodate diskettes of a first size and diskettes of a second smaller size wherein the length of the diskette storage container is an integer multiple of the first size and wherein the width of the diskette storage container is an integer multiple of the second size. By this arrangement, the diskette storage container may accommodate two columns of diskettes of the first size, one column of diskettes of the first size and one row of diskettes of the second smaller size, or a single row of diskettes of the second smaller size.

The preferred means for vertically dividing is comprised of vertical divider channels located on opposed interior walls of the diskette box and divider vanes removably positionable between opposed pairs of the vertical divider channels. The preferred means for varying the depth of the diskette storage box is comprised of a pair of opposed horizontal support rails located on opposed interior side walls of the diskette box and at least one false floor removably positionable across the horizontal support rails. With regard to the means for varying the depth, it is also preferred that the diskette storage cabinet have a nominal depth suitable for accommodating diskettes of the first size with no false floor installed therein, whereby a false floor need only be used to accommodate diskettes of the second smaller size.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 11a-14a and 11b-14b are schematic representations of four basic diskette storage configurations possible with the preferred diskette storage cabinet;

FIGS. 15a-20a and 15b-20b are schematic representations of additional configurations that are possible when two false floors are installed in the preferred diskette storage cabinet.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a hanging diskette storage cabinet.

A preferred hanging diskette storage cabinet 10, according to the present invention, is intended for use with an ordinary file drawer 72. The file drawer 72 is typically part of a larger unit 70 such as a file cabinet or a desk. The file drawer 72 conventionally includes a pair of hanging rails 78 on opposite sides thereof for supporting a plurality of hanging files 80 having file hanger hooks 88.

Figure 1:
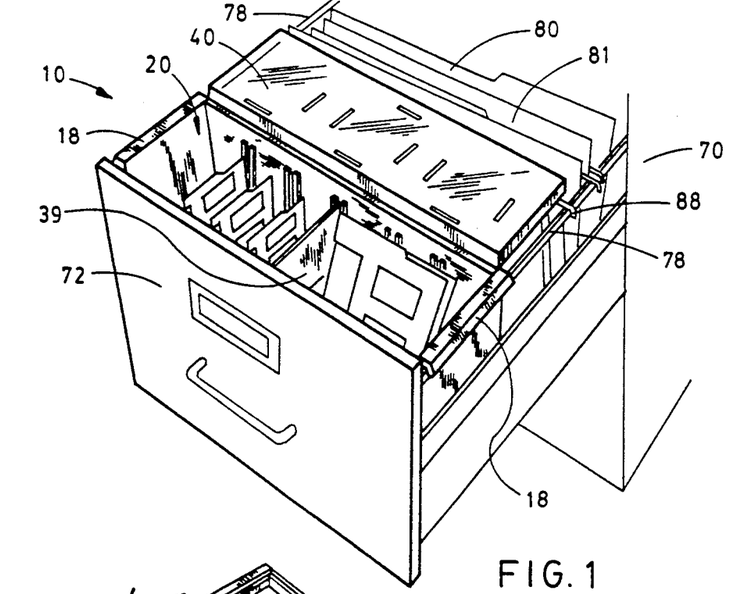
FIG. 1 is a perspective view of a preferred diskette storage cabinet according to the present invention, said diskette storage cabinet support between the hanging rails of an ordinary file drawer.

As shown in FIG. 1, the diskette storage cabinet 10 is comprised of a diskette box 20 having an open top and a lid 40. The diskette box carries a pair of opposed wings 18 which may be used to suspend the diskette storage cabinet 10 between the hanging rails 78. The wings 18 extend outwardly from the box 20 at or near its open top, allowing the lid 40 to rest comfortably on top of the files 80 located behind the diskette storage cabinet 10 and, equally as important, allowing the file drawer 72 to be opened and closed as usual. Because of the latter advantage, the diskettes may be readily accessible yet easily and quickly locked up when not in use.

Figure 7:
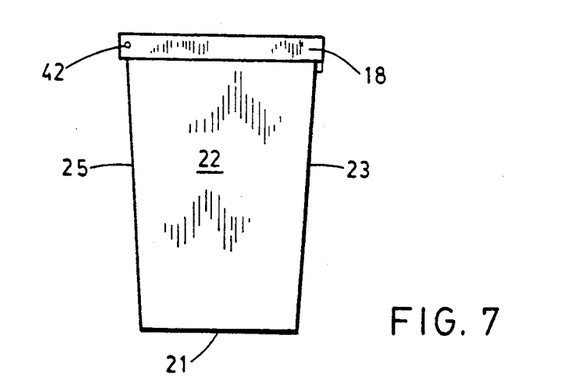
FIG. 7 is a left elevational view of the preferred diskette storage cabinet.
Figure 8:
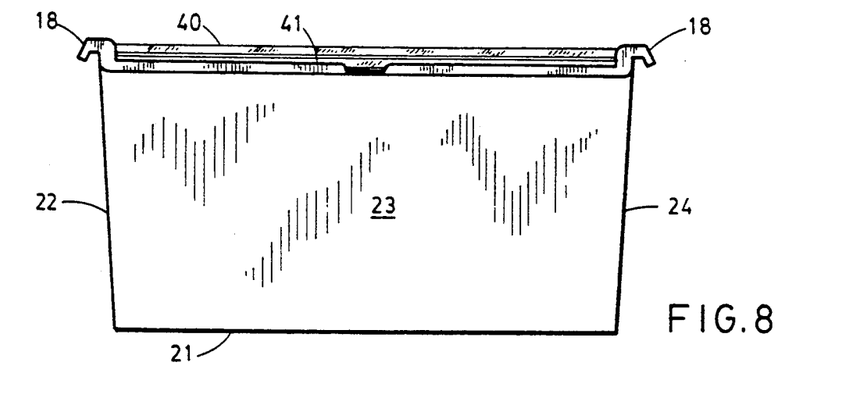
FIG. 8 is a front elevational view of the preferred diskette storage cabinet.
Figure 9:
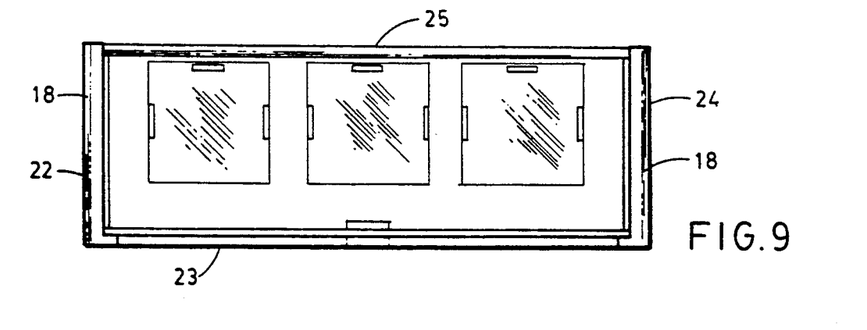
FIG. 9 is a top plan view of the preferred diskette storage cabinet.
Figure 10:
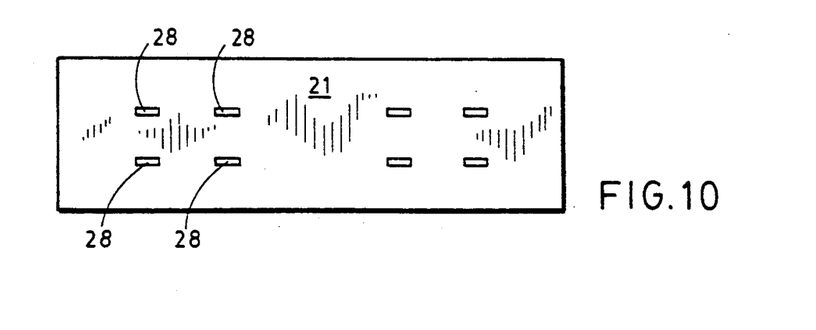
FIG. 10 is a bottom plan view of the preferred diskette storage cabinet.
Figure 11A:
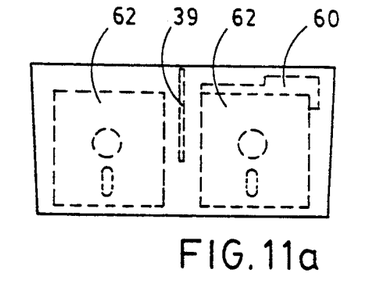
Figure 11B:
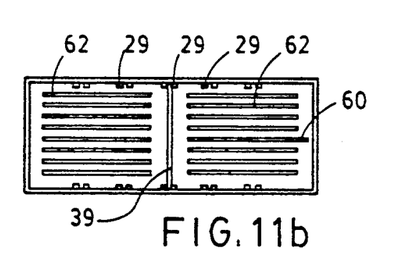
Figure 12A:
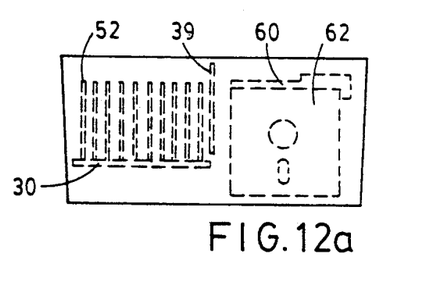
Figure 12B:
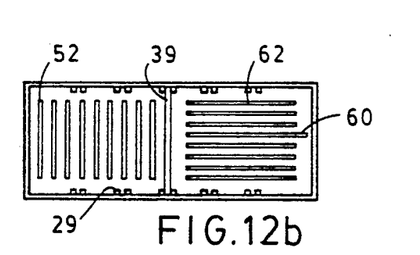
Figure 13A:
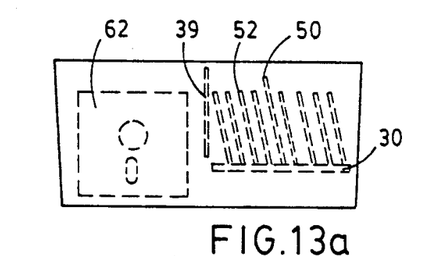
Figure 13B:
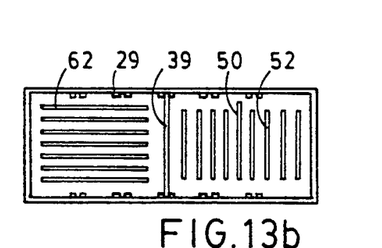
Figure 14A:
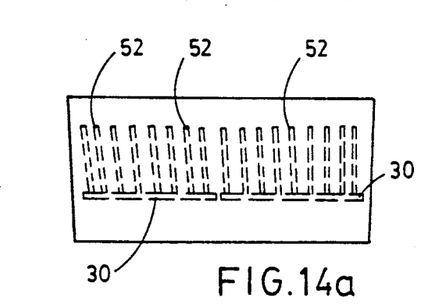
Figure 14B:
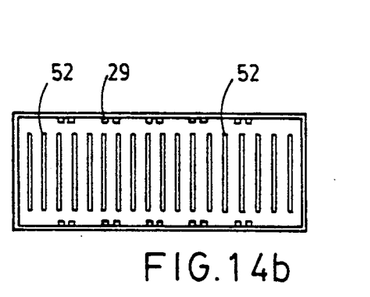
Figure 15A:
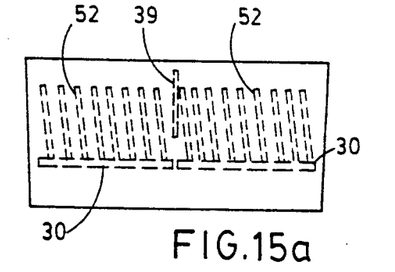
Figure 15B:
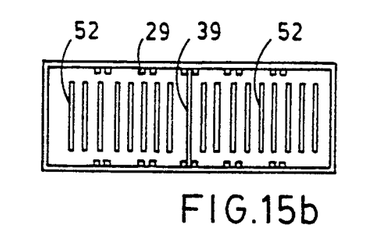
Figure 16A:
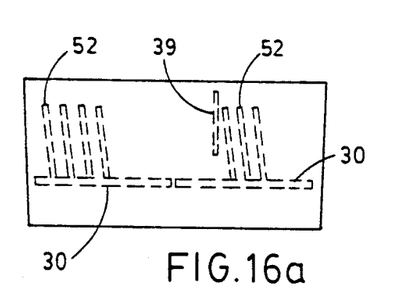
Figure 16B:
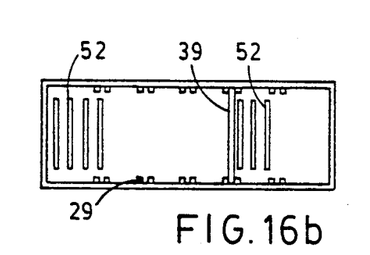
Figure 17A:
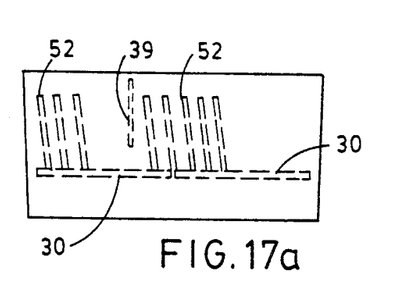
Figure 17B:
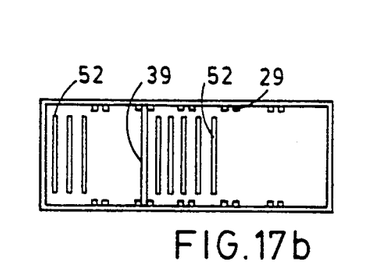

As shown in FIGS. 2-5 and 7-10, the diskette box 20 is comprised of a bottom 21 having a front wall 23, a back wall 25, a left side wall 22 and a right side wall 24, extending upward respectably from front, back and side edges thereof. As shown in FIG. 7 and 8, the front wall 23, back wall 25 and the side walls 22, 24 may have a slight incline to carry disks stored within the diskette storage container 10 at a slide angle for easy viewing. The diskette box 20 is preferably formed of plastic using conventional molding techniques.

As best shown in FIG. 8, the preferred wings 18 are integrally formed with the left and right side walls 22, 24. The distance between the wings 18 is such that the diskette storage container 10 may be simply and easily dropped into the file drawer 72 and supported between the hanging rails 78 as shown in FIG. 1. By this arrangement, the user need not keep the diskette storage container on the desk, but rather need simply pull the file drawer 72 open and then reach in and remove or replace a diskette 52, 62, as needed.

A hinge means 42 is provided for rotatably supporting the lid 40 at the top of the back wall 25. The hinge means 42 is preferably comprised of a pair of outwardly extending posts carried by the lid 40, the posts engaging corresponding sockets in the left and right side walls 22, 24 of the diskette box 20. Various other hinge means are of course possible.

The preferred lid may be rotated up to 270 degrees from the closed position to provide two different open positions. In a first open position, the lid 40 is rotated 180 degrees and rests on top of the files 80. The preferred lid 40 has a recessed surface 41 exposed upward when the lid is in the closed position. When the lid 40 is opened onto the files 80 in the first open position, the recessed surface 41 internally accommodates index tabs 81 carried by the files 80. The recessed surface beneficially allows the lid 40 to lay flat and prevents the index tabs 81 from being damaged.

In a second open position, the user may leave the lid 40 open at all times by rotating it 270 degrees and resting it against the back wall 25. If the diskette box 20 is out of the file drawer 72 and on the user's desk, the second open position may be achieved at any time. If the diskette box 20 is in the file drawer 72, the second open position is achieve by temporarily lifting the diskette box 20 from the file drawer 72 or by temporarily pushing the files 80 away from the diskette box 20. The second open position is beneficial since the lid 40 can be left open without blocking file folders or consuming excessive file drawer space.

Figures 2, 3:
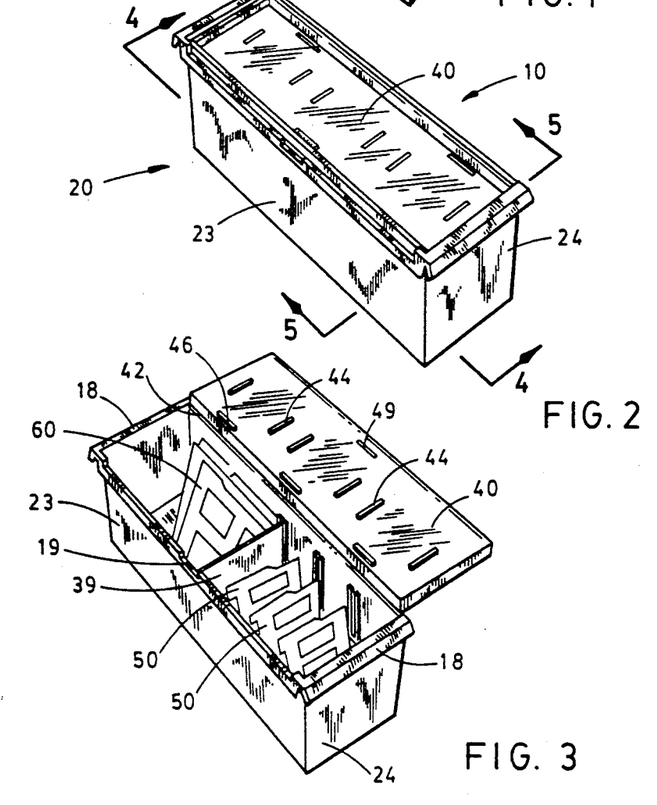
FIG. 2 is a perspective view of the preferred diskette storage cabinet with a lid thereof in a closed position.
FIG. 3 is a perspective view of the preferred diskette storage cabinet with a lid thereof in an open position.

The preferred lid 40 is comprised of transparent plastic so that suitable labels are visible when carried on the underside of the lid. The lid 40 may also be comprised of opaque plastic with appropriate label-sized portions thereof being transparent. As shown in FIG. 3, the underside of the lid 40 carries a plurality of label guides 44 and label stops 46 of L-shaped cross-sections. Typed or handwritten labels may be easily inserted into the label guides 44 for viewing on the opposite side of the lid 40.

A further advantage of the present invention is that the lid 40, when open, will rest on top of the files 80 ordinarily located behind the diskette storage container 10. Moreover, the diskette storage container 10, and the diskettes stored therein, may be securely locked in the file drawer 72 when not in use. The file drawer 72 may even be closed when the lid 40 is open and resting on the files 80 (rotated 180 degrees) or resting on the back wall 25 (rotated 270 degrees). The diskette storage container 10 is particularly convenient where the file drawer 72 is part of the desk occupied by the computer user.

A diskette storage cabinet 10 according to the present invention may be variably configured to accommodate different size diskettes in numerous orientations. This variable configuration aspect of the preferred diskette storage cabinet 10 is accomplished with means for vertically dividing the diskette box 20 into a plurality of diskette storage areas and means for selectably varying the depth of all or part of the diskette box 20.

Figure 4:
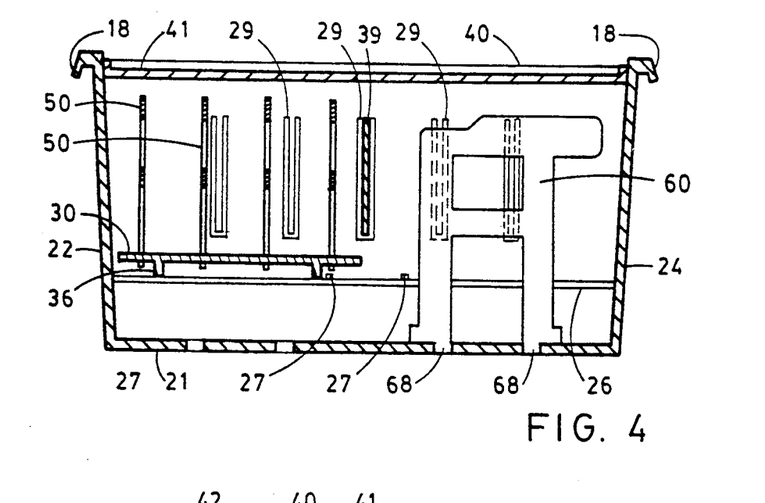
FIG. 4 is cross-sectional view of the preferred diskette storage cabinet of FIG. 2 taken along section lines 4—4.
Figure 5:
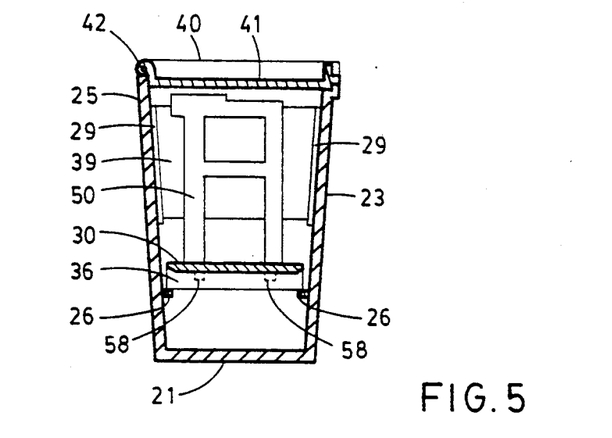
FIG. 5 is a cross-sectional view of the preferred diskette storage cabinet of FIG. 2 taken along section lines 5—5.
Figure 6:
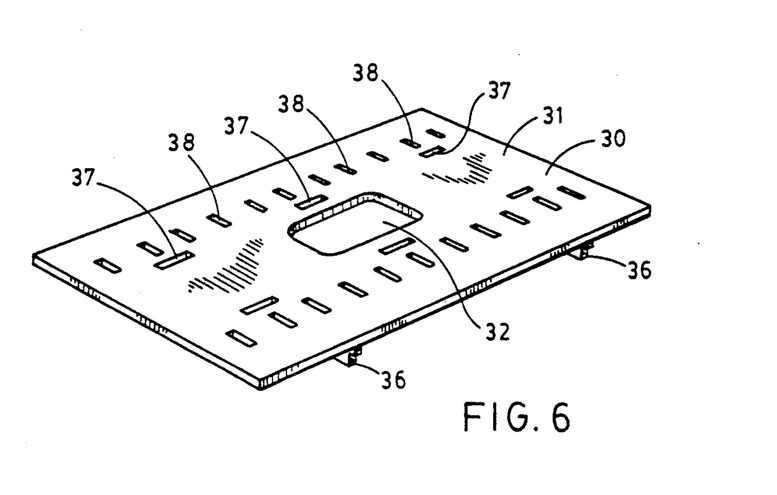
FIG. 6 is a perspective view of a preferred false floor for use with the present invention.

The preferred means for varying the depth comprises a false floor 30 and horizontal support rails 26 carried by the front and side walls 23, 25 (see FIGS. 4, 5 and 6). The user may vary the depth of all or part of the diskette box 20 by placing or not placing the false floor 30 across the opposed horizontal support rails 26. Each of the horizontal support rails 26 preferably includes stops 27. When the false floor is placed on top of the horizontal support rails 26, the joist 36 nearest the center of the box 20 will reside adjacent to the stop 27, preventing the false floor from sliding or moving from the desired position. Each false floor preferably carries a central aperture 32 to accommodate a user's finger during removal.

The diskette storage box 20 preferably has a nominal depth that will accommodate diskettes of a first size (e.g. 5¼") without need for a false floor. With the false floor 30 installed, the depth would preferably be adjusted to accommodate diskettes of a second smaller size (e.g. 3½").

As suggested by FIGS. 11a-14a and respectively corresponding FIGS. 11b-14b, the preferred diskette storage cabinet 10 may be arranged in one of four basic configurations. FIGS. 3, 4 and 5 show the arrangement of the diskette storage cabinet 10 when configured according to FIGS. 12a and 12b. As shown, a divider vane 39 is inserted into a center pair of the vertical divider channels 29 and a false floor 30 is positioned on a left half of the diskette box 20. By this arrangement, the right side of the diskette box 20 has a depth suitable for accommodating diskettes of the first size (e.g. 5¼") and the left side of the diskette box 20 has a depth suitable for supporting diskettes of the second smaller size (e.g. 3½").

FIGS. 14a-20a and 14b-20b depict examples of configurations that are possible when two false floors 30 are installed in the diskette storage box 20. Note that the 3½" disks 52 may be arranged both parallel and perpendicular to the front wall 23 if desired.

The preferred means for vertically dividing comprises vertical divider channels 29 and divider vanes 39 (see FIGS. 3 and 4). The vertical divider channels are preferably carried in opposed pairs by the front and back walls 23, 25 of the diskette box 20. A divider vane 39 may be removably inserted into one or more desired pairs of opposed vertical divider channels 29. The preferred diskette storage box 20 carries five pairs of equally spaced vertical divider channels. By inserting or not inserting the divider vane 39 into appropriate ones of the opposed pairs of vertical divider channels 29, the user may divide the interior of the diskette box 20 into halves, thirds, sixths or not at all.

Figure 18A:
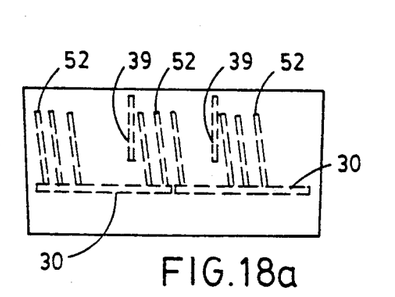
Figure 18B:
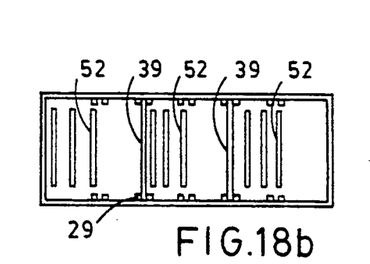
Figure 19A:
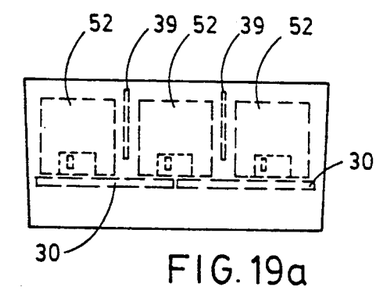
Figure 19B:
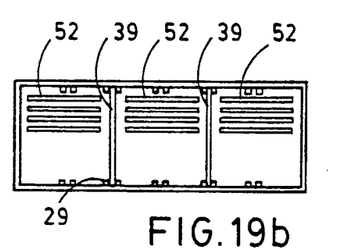
Figure 20A:
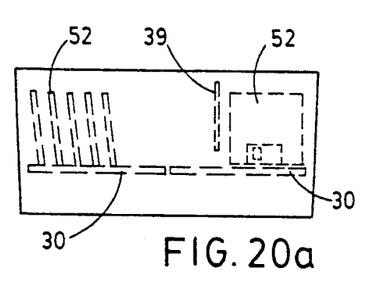
Figure 20B:
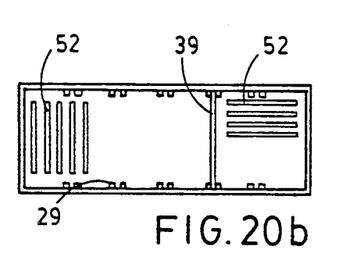
Figure 21:
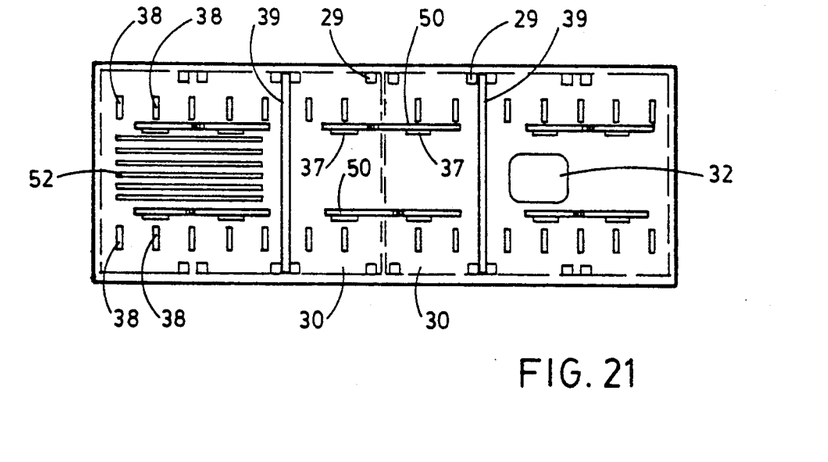
FIG. 21 is a detailed top plan view of the configuration of FIGS. 19a and 19b.

The preferred false floor 30 is shown in FIG. 6. As shown, the preferred false floor 30 is comprised of a horizontal planar portion 31 having a plurality of slots 37, 38 therein and a pair of underlying joists 36. The "perpendicular" slots 38 accommodate a pair of tabs 58 of a plurality of 3½" pivoting diskette separators 50 that are arranged perpendicular to the front wall 23 as best shown in FIGS. 3 and 4. The "parallel" slots 37 accommodate a pair of tabs 58 of a plurality of 3½" pivoting diskette separators 52 that are arranged parallel to the front wall 23 as shown in FIGS. 18a and 18b. As shown in the detailed plan view of FIG. 21, disk separators 50 may even be supported across both false floors 30 in the parallel slots 37 that are closest to the adjacent edges thereof. A functionally similar plurality of slots 28 are carried by the bottom 21 of the box 20 (see FIG. 10) for accommodating a pair of tabs 68 of a plurality of 5¼" disk separators 60 (see FIG. 4).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A hanging diskette storage cabinet for storing and securing diskettes in a file drawer having a pair of hanging rails on either side thereof, comprising:
   a diskette box having an open top;
   a lid for selectively covering the open top of the diskette box;
   a hinge means for movably supporting said lid between a closed position and an open position, the hinge means having an axis of rotation; and
   means for hanging said diskette box, said lid, and said hinge means from the hanging rails with said lid and said hinge means at a sufficiently maximum height relative to a top of a plurality of hanging files supported by said hanging rails so that the lid can open at least 180 degrees about the hinge means' axis of rotation without interference from the plurality of hanging files supported by the hanging rails and with the top of said diskette box, said lid, and said hinge means at a sufficiently minimum height relative to said hanging rails so that, with said lid in either of the open or the closed position, the file drawer may be opened and closed with said diskette box hanging therein, whereby a user may open and close the file drawer to access the disks stored within said diskette box without having to remove said diskette box from the file drawer, may conceal said diskette box and the disks stored therein by closing the file drawer, and may secure said diskette box and the disks stored therein as desired by locking the file drawer.

2. The hanging diskette storage cabinet of claim 1 further comprising:
   means interfitted within said diskette box for vertically dividing said diskette box into a plurality of diskette storage areas.

3. The hanging diskette storage cabinet of claim 2 wherein said diskette box has a first nominal depth suitable for storage of diskettes of a first size and further comprising:
   means interfitted within said diskette box for selectably varying the depth of all or part of said diskette box to a second shallower depth suitable for storage of diskettes of a second smaller size.

4. The hanging diskette storage cabinet of claim 3 wherein the means for vertically dividing comprises:
   at least one pair of vertical divider channels located on opposed interior walls of said diskette box; and
   at least one divider vane removably positionable in said at least one pair of vertical divider channels to divide said diskette box into at least two diskette storage areas.

5. The hanging diskette cabinet of claim 4, further comprising a plurality of pivoting diskette separators including tabs, the separators being similar in size to the diskettes of a second smaller size, and wherein said means for selectably varying the depth comprises:
   a pair of opposed horizontal support rails located on opposed interior side walls of said diskette box; and
   at least one false floor removably positionable across said horizontal support rails, said at least one false floor being supported a particular distance below the top of said diskette box to provide the second shallower depth suitable for storage of diskettes of the second smaller size, said at least one false floor's perimeter consisting of two parallel lengthwise edges and two parallel widthwise edges, the lengthwise edges being perpendicular to the widthwise edges, said at least one false floor including a plurality of lengthwise slots, parallel to the lengthwise edges, and a plurality of widthwise slots, parallel to the widthwise edges, said at least one false floor supporting the pivoting diskette separators by receiving the diskette separators' tabs into desired ones of the lengthwise and widthwise slots and thereby enabling the received diskette separators to pivot about their respective receiving slots in either a lengthwise or a widthwise orientation.

6. The hanging diskette storage cabinet of claim 1 wherein said diskette box has a first nominal depth suitable for storage of diskettes of a first size and further comprising:
means interfitted within said diskette box for selectably varying the depth of all or part of said diskette box to a second shallower depth suitable for storage of diskettes of a second smaller size.

7. The hanging diskette storage cabinet of claim 6 further comprising:
means interfitted within said diskette box for vertically dividing said diskette box into a plurality of diskette storage areas.

8. The hanging diskette cabinet of claim 7, further comprising a plurality of pivoting diskette separators including tabs, the separators being similar in size to the diskettes of a second smaller size, and wherein said means for selectably varying the depth comprises:
a pair of opposed horizontal support rails located on opposed interior side walls of said diskette box; and
at least one false floor removably positionable across said horizontal support rails, said at least one false floor being supported a particular distance below the top of said diskette box to provide the second shallower depth suitable for storage of diskettes of the second smaller size, said at least one false floor's perimeter consisting of two parallel lengthwise edges and two parallel widthwise edges, the lengthwise edges being perpendicular to the widthwise edges, said at least one false floor including a plurality of lengthwise slots, parallel to the lengthwise edges, and a plurality of widthwise slots, parallel to the widthwise edges, said at least one false floor supporting the pivoting diskette separators by receiving the diskette separators' tabs into desired ones of the lengthwise and widthwise slots and thereby enabling the received diskette separators to pivot about their respective receiving slots in either a lengthwise or a widthwise orientation.

9. The hanging diskette storage cabinet of claim 8 wherein the means for vertically dividing comprises:
at least one pair of vertical divider channels located on opposed interior walls of said diskette box; and
at least one divider vane removably positionable in said at least one pair of vertical divider channels to divide said diskette box into at least two diskette storage areas.

10. The hanging diskette storage cabinet of claim 9 wherein said diskette box is comprised of a bottom having front and back edges of a particular length, side edges of a particular width, and having a front wall, a back wall, a left side wall, and a right side wall extending upwardly from respective edges thereof.

11. The hanging diskette storage cabinet of claim 10 wherein:
a diskette of the first size has a dimension X;
a diskette of the second smaller size has a dimension Y;

the particular length of the front and back walls of said diskette box is substantially 2X whereby said diskette box may accommodate two side-by-side groups of diskettes of the first size arranged substantially parallel to the front and back walls inside of said diskette box; and
the particular width of the side walls of said diskette box is substantially Y whereby said diskette box may accommodate a single group of diskettes of the second smaller size arranged substantially parallel to said side walls inside of said diskette box.

12. The hanging diskette storage cabinet of claim 11 wherein said at least one pair of vertical divider channels is comprised of five pairs of vertical divider channels located on the front and back walls at substantially one-sixth increments along the length of the front and back walls whereby a divider vane may be inserted in any one of said pairs of vertical divider channels as desired.

13. The hanging diskette storage cabinet of claim 12 wherein said at least one false floor has a length of substantially X whereby up to two false floors may be positioned across said horizontal support rails to provide a depth in all, part, or none of said diskette box suitable for storage of diskettes of the second smaller size as desired.

14. The hanging diskette storage cabinet of claim 1 wherein said means for hanging the diskette box from the hanging rails is comprised of a pair of opposed outwardly-directed wings integrally formed with the left and right walls of the diskette box.

15. The hanging diskette storage cabinet of claim 14 wherein the lid is made entirely or partially of a transparent material.

16. The hanging diskette storage cabinet of claim 1 wherein said lid is made entirely or partially of a transparent material.

17. A diskette storage box for storing and securing diskettes comprising:
a diskette box having an open top and a first nominal depth suitable for storage of diskettes of a first size, wherein a plurality of bottom slots, parallel with said diskette box's front and back side walls, are formed within the bottom of said diskette box;
a plurality of pivoting diskette separators of a first size that are similar in size to the diskettes of a first size and including tabs on a bottom edge thereof, the bottom of said diskette box supporting the pivoting diskette separators of a first size by receiving the diskette separators' tabs into the bottom slots and thereby enabling the received diskette separators of a first size to pivot about their respective receiving bottom slots;
a plurality of pivoting diskette separators of a second size that are similar in size to the diskettes of a second smaller size and including tabs on a bottom edge thereof; and
means for selectably varying the depth of all or part of said diskette box to a second shallower depth suitable for storage of the diskettes of a second smaller size, said means comprising:
a pair of opposed horizontal support rails located on opposed interior side walls of said diskette box; and
at least one false floor removably positionable across said horizontal support rails, said at least one false floor being supported a particular distance below the top of said diskette box to provide the second shallower depth suitable for storage of diskettes of the second smaller size, said at least one false floor' perimeter consisting of two parallel lengthwise edges and two parallel widthwise edges, the lengthwise edges being perpendicular to the widthwise edges, said at least one false floor including a plurality of lengthwise slots, parallel to the lengthwise edges, and a plurality of widthwise slots, parallel to the widthwise edges, said at least one false floor supporting the pivoting diskette separators of a second size by receiving the diskette separators' tabs into desired ones of the lengthwise and widthwise slots and thereby enabling the received diskette separators to pivot about their respective receiving slots in either a lengthwise or a widthwise orientation.

18. The diskette storage box of claim 16 further comprising means interfitted within said diskette box for vertically dividing said diskette box into a plurality of diskette storage areas.

19. The diskette storage box of claim 18 wherein the means for vertically dividing comprises:
   at least one pair of vertical divider channels located on opposed interior walls of said diskette box; and
   at least one divider vane removably positionable in said at least one pair of vertical divider channels to divide said diskette box into at least two diskette storage areas.

* * * * *